United States Patent

Guest

[11] Patent Number: 5,975,591
[45] Date of Patent: Nov. 2, 1999

[54] COUPLING BODIES

[76] Inventor: John Derek Guest, "IONA", Cannon Hill Way, Bray, Maidenhead, Berkshire SL6 2EX, United Kingdom

[21] Appl. No.: 08/892,874

[22] Filed: Jul. 15, 1997

[30] Foreign Application Priority Data

Jul. 17, 1996 [GB] United Kingdom ............... 9614994

[51] Int. Cl.⁶ ........................................ F16L 39/00
[52] U.S. Cl. ...................... 285/319; 285/323; 285/340
[58] Field of Search .................... 285/340, 302, 285/194, 137.11, 139.3, 140.1, 323, 319

[56] References Cited

U.S. PATENT DOCUMENTS

| | | | |
|---|---|---|---|
| 3,204,988 | 9/1965 | Ouderkirk et al. | 285/340 X |
| 3,532,367 | 10/1970 | Roos | 285/302 |
| 5,163,720 | 11/1992 | Abe | 285/319 |
| 5,593,188 | 1/1997 | Mc Naughton et al. | 285/319 |

FOREIGN PATENT DOCUMENTS 373272  6/1990  European Pat. Off. ............... 285/340

*Primary Examiner*—Dave W. Arola
*Attorney, Agent, or Firm*—Baker & Daniels

[57] ABSTRACT

The disclosure relates to a tube coupling body (13) of circular external cross-section having an internal throughway open at one end to receive a tube with a collet form tube locking device in the open end of the throughway to lock a tube in the coupling body. The coupling body has on its outer side an encircling groove spaced from said one end of the body and a grab ring mounted in the groove of V-shaped cross-section facing the axial direction of the ring towards said one end of the coupling body. One limb of the V-shaped grab ring is lodged in the groove and the other limb projects from the groove at its free end for gripping engagement in a bore in which the coupling body is inserted.

4 Claims, 1 Drawing Sheet

COUPLING BODIES

BACKGROUND OF THE INVENTION

1. Field of the Invention

This invention relates to a tube coupling body and in particular to a coupling body for mounting in a bore or socket of another component.

2. Background Prior Art

UK Patent Specification No. 1520742 discloses a coupling body having an internal throughway open at one end to receive a tube with a locking device in the open end of the throughway to lock the tube in the coupling body. UK Patent No. 2172948 discloses a development of that arrangement in which an insert sleeve is mounted in the open end of the throughway in which the tube locking device engages. The sleeve is held in the throughway by means of a spring ring embedded in the sleeve and having an obliquely inclined outer periphery which bears against and grips the surface of the throughway. Because the spring ring is almost entirely embedded in the insert sleeve, its freedom to flex and therefore its ability to cater for any significant tolerance in the diameter of the throughway is restricted. These problems were addressed in European Patent Publication No. 0373272 in which the coupling body was designed to be mounted in a bore in a housing rather than serve as a free-standing element. The coupling body has an encircling groove and a detent ring with an angled outer periphery is moulded into one side of the groove with the angled outer periphery of the ring extending across the groove and therefore be free to flex to cater for variation in diameter of the socket. This arrangement provided a secure mounting for a coupling body in a housing but the coupling body is difficult to mould because of the angled outer periphery of the spring ring which makes it difficult to extract tooling for forming the groove. In a further development, the subject of our European Patent Publication No. 0751334, a coupling body is formed in two parts, one component having a bore in which the other component is mounted, the latter component having a spring metal ring with outwardly projecting fingers mounted in one side of a groove so that the fingers are bent over as the inner body is inserted into the outer body to retain the inner body in engagement in the outer body. In order to enable the outer ends of the fingers of the rings to be bent over as the inner body is inserted in the outer body, the metal ring has to be made fairly flexible and so the arrangement is more suitable to more lightly loaded components.

SUMMARY OF THE INVENTION

The invention provides a tube coupling body of circular external cross-section having an internal throughway open at one end to receive a tube with a locking device in the open end of the throughway to lock a tube in the coupling body, the coupling body having on its outer side an encircling groove spaced from said one end of the body and a grab ring mounted in the groove of V-shaped cross-section facing the axial direction of the ring towards said one end of the coupling body, one limb of the V being lodged in the groove and the other limb projecting from the groove at its free end for gripping engagement in a bore in which the coupling body is inserted.

The grab ring provides a high strength gripping device for locking the coupling body in the bore or socket in another component. As such, the arrangement is particularly suitable for use in combination with the high strength collet arrangement described and illustrated in our UK Patent Application No. 9519199.5. The arrangement is however also suitable for use with a wide range of different coupling body mountings.

Preferably the coupling body has an encircling recess next to the groove on the side of the groove nearest the one end of the coupling body and said other limb of the V-section extends over the recess when in its free state so that when the coupling body is inserted in a bore and the free end of the limb is deformed inwardly, the recess can accommodate the limb.

Further the corner of the coupling body between the groove and recess may be chamfered.

In any of the above arrangements the groove may be of rectangular cross-section and said one limb of the V is lodged at the corner of the groove between the bottom and side of the groove nearest said one end of the coupling body and extends obliquely across the groove with the apex of the V lodged on the other side of the groove.

Also in any of the above arrangements the grab ring may be part annular.

BRIEF DESCRIPTION OF THE DRAWINGS

The following is a description of a specific embodiment of the invention, reference being made to the accompanying drawings in which.

DESCRIPTION OF THE PREFERRED EMBODIMENT

Figure 1:
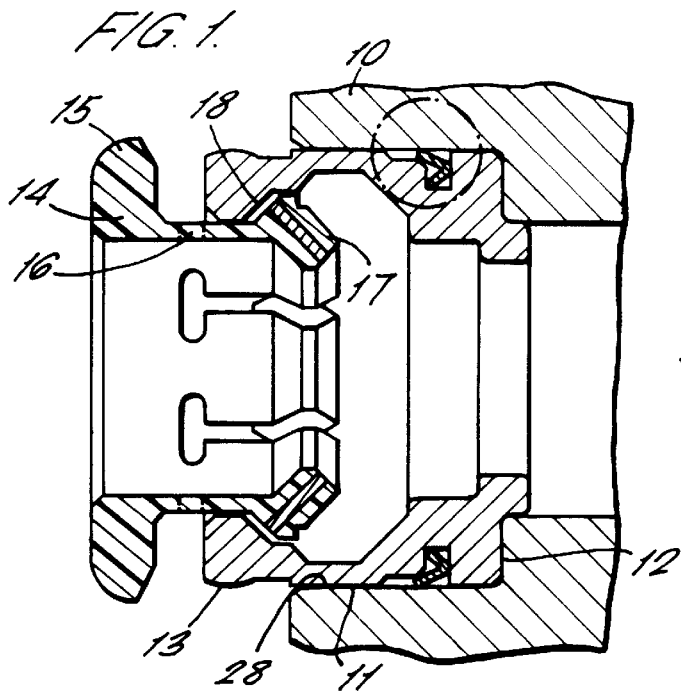
FIG. 1 is a sectional view through a tube coupling body located in a bore in a socket and held in the socket by a grab ring arrangement.
Figure 2:
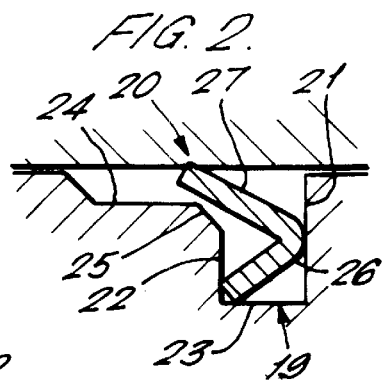
FIG. 2 is an enlarged view of the grab ring encircled on FIG. 1.

Referring firstly to FIGS. 1 and 2 of the drawings, there is shown a component 10 having an open-ended bore or socket 11 formed with a step 12 spaced from the open end in which a coupling body 13 of a tube coupling is mounted. The tube coupling has a collet 14 through which a tube is inserted. The collet comprises an annular head 15 having axially extending fingers 16 formed with angled heads 17 at their distal ends. The heads 17 engage with an inclined annular face 18 formed in the coupling body. The heads 17 also engage in an annular V-section groove formed around the tube to be located in the coupling body to lock the tube in the body. Further details of the collet, tube and internal part of the coupling body are to be found in our UK Patent Application No. 9519199.5 to which reference should be made.

The external periphery of the coupling body 13 is generally cylindrical as indicated at 18 and is formed with an annular groove 19 to receive a part annular grab ring 20 to engage the bore 11 of the component 10 to hold the coupling body in the component.

The annular groove 19 has parallel sides 21,22 and a bottom wall 23. The coupling body to the side of the groove nearest the open end of the coupling body is formed with an encircling recess 24 and a corner between the recess 24 and adjacent side 22 of the groove is chamfered as indicated at 25.

The grab ring 20 is V-shaped cross-section facing axially of the grab ring and having an inner shorter limb 26 and an outer longer limb 27. The grab ring is mounted in the groove with the V-shape facing towards the open end of the coupling body with the shorter limb 26 lodged in the corner of the groove between the side 22 and bottom 23 of the groove and the apex of the V bearing against the opposite side 21 of the groove. The longer limb of the V 27 projects outwardly of the groove over the chamfered corner 25 and recess 24 so that when the coupling body 13 is forced into the bore 11, the limb 27 is squashed inwardly into the recess and the outer edge of the limb is pressed hard against the bore 11 of the component 10. Thus the grab ring forms a powerful gripping engagement with the bore 11 to resist extraction of the coupling body 13 from the component 10.

Figure 3:
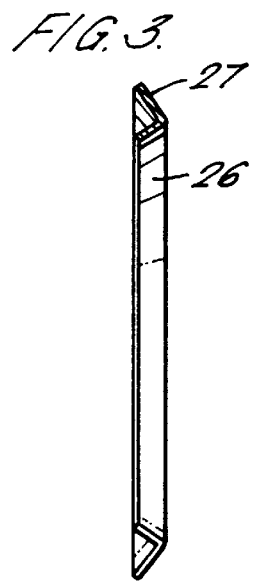
FIG. 3 is a side view of the grab ring.
Figure 4:
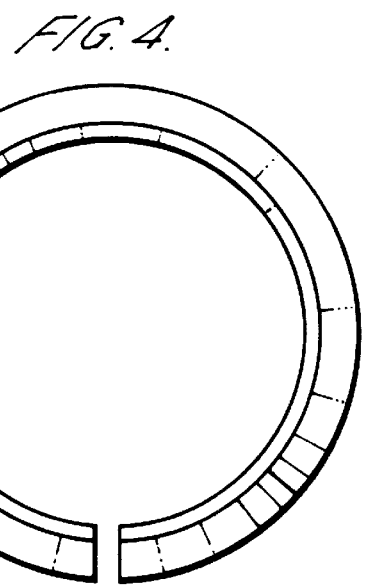
FIG. 4 is a plan view of the grab ring.
Figure 5:
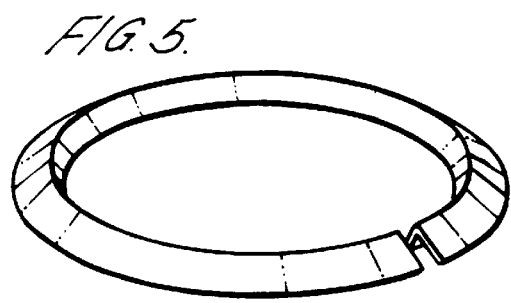
FIG. 5 is a perspective view of the grab ring.

The grab ring is shown removed from the coupling body in FIGS. 3, 4 and 5 for the sake of clarity.

It will be appreciated that many modifications may be made to the above described embodiment without departing from the scope of the invention. For example, the locking arrangement for the coupling body can be used with other forms of tube locking other than the collet arrangement disclosed. Thus a grab ring could also be used for locking the tube in the coupling body.

I claim:

1. A tube coupling body of circular external cross-section having an outer side and an internal throughway open at one end to receive a tube with a locking device in the open end of the throughway to lock a tube in the coupling body, the coupling body having on its outer side an encircling groove spaced from said one end of the body and a grab ring having a V-shaped cross-section and an axis, said grab ring having divergent inner and outer limbs with respect to the ring axis, the ends of said limbs facing in the axial direction of the ring towards said one end of the coupling body and being of different lengths, the inner limb of the V-shaped ring being the shorter limb and the outer limb being the longer limb, said inner and outer limbs located in said groove with a portion of said outer limb projecting from the groove at its free end for gripping engagement in a bore in which the coupling body is inserted, said outer side of the coupling body having an annular recess next to and communicating with said groove on the side of said groove nearest said one end of the coupling body, said outer limb of the V-shaped grab ring having a distal end which extends over said recess whereby, when said coupling body is inserted in a bore, said distal end is depressed inwardly into said recess.

2. A tube coupling body as claimed in claim 1, wherein the corner of the coupling body between the groove and recess is chamfered.

3. A tube coupling body as claimed in claim 2, wherein the groove is of rectangular cross-section and said inner limb is lodged at the corner of the groove between the bottom and side of the groove nearest said one end of the coupling body and extends obliquely across the groove with the apex of the V-shaped grab ring lodged on the other side of the groove.

4. A tube coupling body as claimed in claim 1, wherein the grab ring is discontinuous.

* * * * *